United States Patent

Fu et al.

(10) Patent No.: US 8,166,054 B2
(45) Date of Patent: Apr. 24, 2012

(54) SYSTEM AND METHOD FOR ADAPTIVELY LOCATING DYNAMIC WEB PAGE ELEMENTS

(75) Inventors: Rong Yao Fu, Beijing (CN); Wei Gao, Beijing (CN); Yi Qin Yu, Beijing (CN); Shiwan Zhao, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 394 days.

(21) Appl. No.: 12/472,963

(22) Filed: May 27, 2009

(65) Prior Publication Data
US 2009/0300056 A1  Dec. 3, 2009

(30) Foreign Application Priority Data
May 29, 2008 (CN) .......................... 2008 1 0108874

(51) Int. Cl.
*G06F 7/00* (2006.01)
*G06F 17/30* (2006.01)
(52) U.S. Cl. ........................................ 707/755; 707/756
(58) Field of Classification Search .................. 707/755, 707/756
See application file for complete search history.

(56) References Cited

U.S. PATENT DOCUMENTS

| | | | |
|---|---|---|---|
| 5,855,015 A * | 12/1998 | Shoham | 715/205 |
| 7,058,695 B2 * | 6/2006 | Takagi et al. | 709/217 |
| 7,096,455 B2 * | 8/2006 | Santiago | 717/114 |
| 7,143,344 B2 * | 11/2006 | Parker et al. | 715/236 |
| 7,194,683 B2 | 3/2007 | Hind et al. | |
| 2002/0143821 A1 | 10/2002 | Jakubowski | |
| 2005/0262063 A1 | 11/2005 | Conboy et al. | |
| 2009/0125495 A1 * | 5/2009 | Zhang et al. | 707/4 |

FOREIGN PATENT DOCUMENTS
WO  WO 0190873 A1  11/2001

OTHER PUBLICATIONS

Marek Kowalkiewicz et al., "myPortal: Robust Extraction and Aggregation of Web Content", VLDB '06, Sep. 12-15, 2006, Seoul, Korea.

* cited by examiner

*Primary Examiner* — John R. Cottingham
*Assistant Examiner* — Mariela Reyes
(74) *Attorney, Agent, or Firm* — Ido Tuchman; Gail H. Zarick

(57) ABSTRACT

A system and method for adaptively locating dynamic web page elements. The system includes an XPath refiner for refining an XPath path expression of the web page element based on an HTML knowledge database describing HTML tag relationships and attribute importance; and an enhanced XPath resolving engine, for searching an HTML DOM tree of the target web page for the web page element through the refined XPath path expression. The invention can locate required Web contents in dynamic web pages in spite of the variety of web contents by using an HTML knowledge database. Also provided is a computer readable article of manufacture embodying computer readable instructions for executing the above method.

14 Claims, 5 Drawing Sheets

SYSTEM AND METHOD FOR ADAPTIVELY LOCATING DYNAMIC WEB PAGE ELEMENTS

CROSS-REFERENCE TO RELATED APPLICATION

This application claims priority under 35 U.S.C. §119 from Chinese Patent Application No. 200810108874.3 filed on May 29, 2008, the entire contents of which are incorporated herein by reference.

BACKGROUND OF THE INVENTION

1. Field of the Invention

The invention generally relates to data query and collection, and particularly relates to a system and method for adaptively locating dynamic web page elements.

2. Description of Related Art

Along with the rapid growth of the World Wide Web, (WWW), web contents are becoming richer and richer. In the era of Web 2.0, it is estimated that there are about 15 to 30 billion web pages on the Web. Therefore, it is becoming a burdensome effort for users to manually access web pages one-by-one and locate contents of interest. Therefore, many web sites provide the web services named REST, SOAP, WSDL, FEED, and other web services for machine access. However, in contrast to the fast growth of web pages and their contents, the improvements of these Web services are much slower. Most information on web pages is still only accessible to people visiting the web pages.

Although web pages may be well designed for accessing by users, such design only focuses on the presentation structure or type setting for the end users. It is difficult to simultaneously give consideration to the demands of Web services for machine access. Further, web pages distributed on the Web are usually highly dynamic, volatile, distributed, and heterogeneous. Moreover, when compared with traditional plain text documents, web page contents are often much more diverse.

To this extent, in order to leverage the huge informational and functional resources of the Web, there are many existing tools that allow users to cut user interfaces from the existing Web, extract data, functions and processes, and transform them into reusable subscription files (FEEDs) and services.

The extraction of data from web pages is always implemented through XPath. XPath means XML Path Language, which is a language for finding information in an Extensible Markup Language, (XML), document and determining the location of some part in the XML document. XPath can be used as a light-weight query language by developers, for navigating elements and attributes through an XML document. There are seven kinds of nodes in XPath: element, attribute, text, namespace, processing-instruction, comment, and document (root) nodes. XML documents are treated as trees of nodes. The root of a tree is called the document node or root node. XPath uses path expressions to select nodes or node-sets in an XML document.

These path expressions look very much like the expressions that can be seen in a traditional computer file system. The path can be an absolute path or a relative path. A path expression may have predicates, wildcards, and operators. XPath also includes over one hundred built-in standard functions, for string values, numeric values, date and time comparison, node manipulation, sequence manipulation, Boolean values, and more. Some exemplary XPath path expressions may be shown as below:

/html/body/div/div/form/table/tr[1]/td/input [@name=keyword]; /html/body/div/ . . . p/div/a [@content=next]; and . . . /input[@id=12345].

There are many new technologies and applications in commercial, academic and industrial fields, which are developed and implemented for extracting data, functions, and processes from the Web based on XPath. For example, first a web page is parsed into an HTML (Hypertext Markup Language) DOM (Document Object Model) tree. The DOM mentioned here means the standard document object model defined by W3C, (World Wide Web Consortium). It represents HTML and XML (Extensible Markup Language) documents in tree structures, and defines methods and attributes for traversing the tree and checking and modifying the nodes of the tree.

Under the DOM tree structure, various nodes of an HTML document are regarded as various types of node objects. Each node object has its own attributes and methods, which may be utilized for traversing the whole document tree. After a DOM document tree is generated, the required elements may be queried with attribute and tag names. Then, the elements, i.e., the required data, can be located through XPath. Once the data required by a user has been extracted from the web page, its XPath-based path expression can be recorded, and the data can be located and accessed once again through the recorded XPath path expression when needed in the future.

However, as a result of the highly dynamic nature of web pages, most web pages are generated dynamically, so that the contents of web pages are often varied. Further, many web sites may update their web pages periodically, such as by adding, modifying, or deleting contents, formats, or layouts of the existing web pages. These updates or modifications will often affect the XPath path expressions of the data in the web pages such that when a user tries to access the required data through the XPath path expression previously recorded, the data may not be found or wrong data is located. Therefore, the above method for accessing and extracting data based on XPath is not adaptive.

Thus, in order to extract required data and functions from web pages when the pages are varied dynamically, one of the biggest challenges is to locate unstructured or semi-structured data accurately. Therefore, there is a need for the technology for XPath-based locating required Web contents in dynamic web pages in spite of the variety of web contents.

SUMMARY OF THE INVENTION

According to one aspect of the present invention, there is presented a system for adaptively locating a dynamic web page element. The system includes:

an XPath refiner, for performing a process of refining an XPath path expression of the web page element based on the HTML knowledge database describing HTML tag relationships and attribute importance; and an enhanced XPath resolving engine, for searching an HTML DOM tree of the target web page for the web page element through the refined XPath path expression.

According to another aspect of the present invention, there is presented a method for adaptively locating dynamic web page elements. The method includes:

refining an XPath path expression of the web page element based on an HTML knowledge database describing HTML tag relationships and attribute importance; and searching an HTML DOM tree of the target web page for the web page element through the refined XPath path expression.

According to a yet another aspect of the present invention, there is presented a computer readable article of manufacture tangibly embodying computer readable instructions for executing a computer implemented method for adaptively locating a dynamic web page element. The method includes:

refining an XPath path expression of the web page element based on an HTML knowledge database describing HTML tag relationships and attribute importance; and searching an HTML DOM tree of the target web page for the web page element through the refined XPath path expression.

DETAILED DESCRIPTION OF THE PREFERRED EMBODIMENTS

Figure 1:
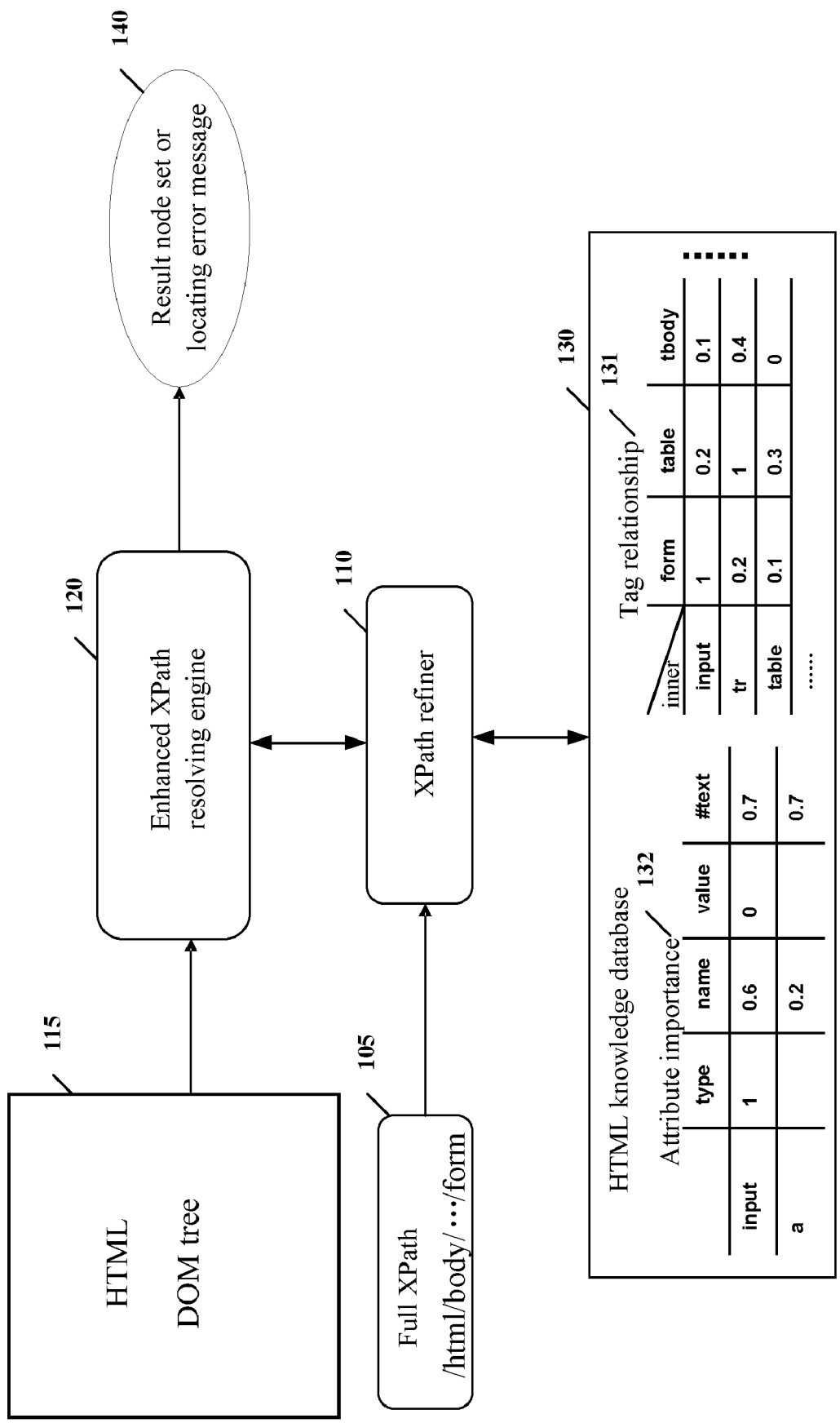
FIG. 1 illustrates a system for adaptively locating a dynamic web page element according to an embodiment of the present invention.

The novel features and characteristics of the embodiments of the present invention are set forth in the embodiments of the present invention and its preferred mode together with further objects and advantages of the preferred embodiments which are best appreciated from reading of the following detailed description of the illustrative embodiments taken in conjunction with the drawings. It is noted that the same or similar labels designate the same or similar elements or components throughout the figures.

The exemplary embodiments of the invention will be described below in conjunction with the accompanying figures. For clarity and simplicity, not all features of the actual implementation are described in the specification. However, it should be appreciated that many implementation-specific decisions must be made in the procedure of developing any of such actual embodiments in order to realize the particular objectives of developers, for example complying with those limiting conditions related to systems and businesses, where the limiting conditions may be varied depending on the implementation. Further, it should be appreciated that although the development effort may be complicated and time-consuming, such development effort is only a routine task for those skilled in the art who benefit from this disclosure.

Moreover, it is further noted that, in order not to obscure the invention by unnecessary details, only the apparatus structures and/or processing steps related to the scheme according to embodiments of the invention are shown in the accompanying figures, while other details not relative to the invention are omitted.

The present invention locates contents in web pages based on XPath and by combining an HTML knowledge database, so that it is suitable for adaptively querying and locating a required web page element in a dynamically changing web page. According to an embodiment of the invention, first an XPath is used for locating a required web page element in an HTML DOM tree. In the case that the required web page element is not found, the XPath is refined step-by-step according to an HTML knowledge database in an order from specific to general, thereby expanding the query scope of the XPath so as to locate the required element within a wider scope. Finally the required element can be found or a locating error message can be outputted.

In an embodiment of the invention, the process of XPath refining can remove some tags with weaker relationships and/or unimportant attributes from an XPath path expression according to an HTML knowledge database. Such removing process may be implemented in various ways, which include, but are not limited to:

(i) using weighed values to represent relationships of tags and importance of attributes, and according to the weighted values, either from large to small or from small to large, the tags and/or attributes are removed from the XPath step-by-step;

(ii) removing tags and/or attributes from the XPath with logical values, 0 or 1, or switch values, Yes or No, for example, keeping the tags and/or attributes of logical value 1 or switch value Yes, and removing the tags and/or attributes of logical value 0 or switch value No; and (iii) only saving tags and/or attributes to be reserved in the XPath in the HTML knowledge database, so that in the XPath refining process the tags and/or attributes that do not exist in the HTML knowledge database are removed from the XPath.

It is noted that, in addition to the ways cited above, other ways for refining XPath path expressions can be readily appreciated by those skilled in the art. They can be construed as falling into the spirit and scope of the present invention.

To better understand the present invention and its features and advantages, the invention and its embodiments are described in detail in the following. Referring to FIG. 1, FIG. 1 illustrates a system for adaptively locating a dynamic web page element according to an embodiment of the present invention. As shown in FIG. 1, the system includes an XPath refiner 110, an enhanced XPath resolving engine 120, and an HTML knowledge database 130. In the system, the input to the XPath refiner 110 is a full XPath with respect to the data required by a user. For example, a user needs to query a form, for which the initial XPath path expression is:

/html/body/ . . . /form.

The XPath path expression 105 is used for representing the location of the required data (target web page element). The input to the enhanced XPath resolving engine 120 is an HTML DOM tree 115 generated with the target web page. Generating a corresponding HTML DOM tree with a web page is well known by those skilled in the art. There are many technologies to complete such process, which are not further described herei so as not to confuse the present invention. The output from the enhanced XPath resolving engine 120 is a result node set or a locating error message 140.

The HTML knowledge database 130 describes relationships of HTML tags and importance of attributes. The designing and generating of the HTML knowledge database 130 may be performed in various ways, for example, by statistical analysis, research on web page design experiences, or manual work. The HTML knowledge database 130 for example includes an HTML tag relationship table 131 and an HTML attribute importance table 132.

The exemplary brief representations of the two tables may be referred to in the following Table 1 and Table 2. It should be noted that, since the HTML tag relationship table and the HTML attribute importance table represent a kind of data structure, they may adopt database tables, or adopt any other storage manners of data structures that are well known by those skilled in the art, such as, configuration files, XML files, for example.

TABLE 1

HTML tag relationship table

| Inner | form | table | tbody | ... |
|---|---|---|---|---|
| input | 1 | 0.2 | 0.1 | ... |
| tr | 0.2 | 1 | 0.4 | ... |
| table | 0.1 | 0.3 | 0 | ... |
| ... | | | | |

First, referring to Table 1, the HTML tag relationship table 131, Table 1 represents relationships between HTML tags. The first column and the first row list various HTML tags respectively, in which the tags listed in the leftmost column are located in the inner part of an XPath path expression, i.e., closer to the ending of the XPath. This means that such a tag substantially corresponds to the tag of the element to be queried by a user of a dynamic web page. The numbers in Table 1 represent relationships between tags, which may be denoted by weight values.

For example, referring to the tag of input in the second row of Table 1, the corresponding relationship weights between it and the tags of form, table, tbody are 1, 0.2, 0.1, respectively, where the corresponding relationship weight between the tag of input and form is much larger than the relationship weights between the tag of input and other tags. It can be seen from above that the relationship between the tag of input and form is closer in contrast to other tags. Similarly, since the corresponding relationship weight between the tag of input and tbody is 0.1; it is noted that the relationship between the tag of input and tbody is not comparatively close.

In this way, in the process of refining an XPath path expression step-by-step according to the scheme of the embodiment of the invention, the tag of tbody will be the first one that is removed from the XPath path expression preceding the locating and querying of the web page element. If the element is still not found, the tag of table will be sequentially removed as well as other tags not shown whose weight values are lower than the relationship weight of the tag of form. The tag of form will be kept in the XPath for the longest time comparatively. Of course, in the case that the web page element required by the user still cannot be located in the web page, compared with other not shown tags whose weight values are higher than the relationship weight of the tag of form, the tag of form will be removed from the XPath earlier. It is noted that not all HTML tags and the relationships between them are shown in Table 1 for the simplicity of this specification. Those skilled in the art can contemplate that the enumeration of other HTML tags and the definition of their relationships will also be fallen into the spirit and scope of the present invention.

TABLE 2

HTML attribute importance table

| | type | name | value | #text | ... |
|---|---|---|---|---|---|
| input | 1 | 0.6 | 0 | 0.7 | ... |
| a | 0 | 0.2 | 0 | 0.7 | ... |
| ... | | | | | |

Referring to Table 2, the HTML attribute importance table 132) Table 2 represents the importance of HTML attributes relative to HTML tags. The first column in Table 2 lists various HTML tags, while the first row lists names of HTML attributes. The numbers in Table 2 represent the importance between respective tags and their corresponding attributes, which may be denoted by weight values. For example, referring to the tag of input in the second row of Table 2, the corresponding importance weights between it and the attributes of type, name, value, #text are 1, 0.6, 0, 0.7, respectively, where the corresponding importance weight between the tag of input and the attribute of type is much larger than the importance weights between the tag of input and other attributes.

It can be seen from above that the attribute of type in the tag of input is more important in contrast to other attributes. Similarly, since the importance weight between the tag of input and the attribute of value is 0, it is denoted that the attribute of value in the tag of input is not important. In this way, in the process of refining an XPath path expression step-by-step according to the scheme of the embodiment of the invention, the attribute of value will be the first one that is removed from the XPath path expression preceding the locating and querying of the web page element.

If the element is still not found, the attributes of name, #text will be sequentially removed as well as other not shown attributes whose importance weights are lower than the importance weight of the attribute of type. The attribute of type will be kept in the XPath for the longest time, comparatively. Of course, in the case that the web page element required by the user still cannot be located in the web page, compared with other not shown attributes whose weight values are higher than the importance weight of the attribute of type, the attribute of type will be removed from the XPath earlier. It is noted that not all HTML tags and the importance between the respective tags and their attributes are shown in Table 2 for the simplicity of this specification. Those skilled in the art can contemplate that the enumeration of other HTML tags and the definition of their importance and their attributes will also fall into the spirit and scope of the present invention.

It is noted that the tag relationships and attribute importance listed in the above HTML tag relationship table 131, Table 1, and the HTML attribute importance table 132, Table 2, in the HTML knowledge database 130 are not static. Instead, they can be updated or modified dynamically at any time according to web page design experience or based on XPath query results, in order to get more accurate results in refining the XPath step-by-step. Moreover, in different application fields, the HTML knowledge database 130 may be different. That is to say, only one embodiment of the HTML tag relationship table and the HTML attribute importance table is enumerated in this specification. According to related knowledge in different fields, the requirements of HTML tag relationships and the HTML attribute importance may be different. Thus, the various resulting weight values listed in Table 1 and Table 2 may be different. This, however, falls into the spirit and scope of the present invention.

In order to accurately locate a web page element in a dynamic web page, a step-by-step refining mechanism is used in the invention. According to the mechanism, if one or more web page elements are located successfully through an XPath path expression, the web page elements are returned. If no web page element can be located according to the current XPath path expression, it is required that the location of the web page element in the XPath be refined, so that it contains a wider query scope, and the possibility of finding the required web page element is increased accordingly. A threshold is defined, which may be adjusted along with the step-by-step XPath refining. In an embodiment of the present invention, when the XPath refining is to be performed, all tags and attributes whose weight values are lower than the threshold will be removed from the XPath path expression, and a new query will be performed again.

If the web page element is still not found in this query, the threshold is incremented, and more tags and attributes, whose weight values are lower than the incremented threshold, are further removed from the XPath according to the incremented threshold, thereby further expanding the query scope. The above process is a repeating process, which will end when the required web page element is found or the threshold is larger than or equal to a preset maximum threshold. When the web page element is found, the web page element is returned and presented to the user; and when the threshold is larger than or equal to the preset maximum threshold, the query process is stopped, and a locating error message which represents that the required web page element is not found in the target web page is returned.

It is noted that, although for simplicity, the threshold incrementing is taken as an example for representing the threshold adjusting in the context of the present specification, the invention is not limited to this. In an alternative embodiment of the invention, the threshold may be decremented step-by-step. Accordingly, when the XPath refining is to be performed, all tags and attributes whose weight values are higher than the threshold will be removed from the XPath path expression, and a new query will be performed again. The above process is a circular process, which will end when the required web page element is found or the threshold is smaller than or equal to a preset maximum threshold. As a result, the found web page element or a locating error message is returned accordingly.

Returning to FIG. 1 again, the XPath refiner 110 first receives a full XPath path expression with respect to the web page element required by the user, performs the refining process step-by-step with respect to the XPath path expression based on the HTML knowledge database 130, then passes the refined XPath path expression to the enhanced XPath resolving engine 120. Further, the XPath refiner 110 also defines a threshold and assigns it a value.

The XPath refiner 110 refines the XPath path expression with a threshold using the HTML knowledge database 130. The refining process is as followed: the tags, for which the relationships, or weight values, corresponding to the required element in the HTML tag relationship table 131 of the HTML knowledge database 130 are lower than the threshold, are removed from the XPath path expression. Based on the required web page element, the attributes, for which the importance, weight values, corresponding to the required element in the HTML attribute importance table 132 of the HTML knowledge database 130 are lower than the threshold, are removed from the XPath path expression.

If the required element cannot be found through the refined XPath by the enhanced XPath resolving engine 120, the threshold is incremented. When the threshold is larger than or equal to a preset maximum threshold, the XPath refiner 110 notifies the enhanced XPath resolving engine 120 to stop the process of locating the web page element, and returns a locating error message.

The enhanced XPath resolving engine 120 receives the HTML DOM tree of the target web page, then searches the HTML DOM tree for the required data or web page element through the refined XPath, for example, by traversing the HTML DOM tree to find the required data or web page element. If one or more corresponding elements are found, the result is outputted as a result node set, and presented to the user as the web page element required by the user. Otherwise, if no corresponding element is found, the XPath refiner 110 is notified to further refine the XPath path expression, thereby expanding the XPath query scope. Then, the enhanced XPath resolving engine 120 further searches the HTML DOM tree according to the refined XPath path expression.

In the case for which the number of web page elements found and returned by the enhanced XPath resolving engine 120 is more than one, it is observed that there may be some noise, i.e., there may be some data or elements that are not what the user requires. This may be caused by the following:
  (i) the data query granularity is not fine enough;
  (ii) the data required by the user and the noise data are located at the same level of the XPath, i.e., the current XPath path expressions of the two data are identical;
  (iii) the data required by the user is replicated at least once in the dynamic web page. In any case, the user will get a set of web page elements, and can then determine how to improve the query result. In the first case, the user can reduce the amplitude of threshold incrementing and have the system repeat the operation of the process.

For example, assuming that initially the threshold is incremented by 0.3 at a time, the incrementing quantity can be changed to 0.1. In this way, there are fewer tags and attributes that are filtered from the XPath each time that the threshold is incremented, i.e., there are more tags and attributes that are reserved for query, so that the noise may be eliminated. In the latter two cases, the user may either manually determine which result is the required one, or the results may be determined automatically by a machine in other ways, for example, by comparing characteristic difference between the original data and the query result. Such comparing may be done in ways known by those skilled in the art. Further, the user may appreciate that one or more tag relationships or attribute importance saved in the HTML knowledge database 130 are not accurate enough, for example, too high or too low, thereby resulting in the generation of a result set with noise. Therefore, the user may modify the data saved in the HTML knowledge database 130 for generating a more accurate result set.

As can be seen by those skilled in the art, in the operation of refining an XPath path expression by the XPath refiner 110 by combining the HTML knowledge database 130, depending on the data query granularity, the overall calculating capability of the system, or any other particular demands, the refining may be performed by removing tags with lower weight values from the XPath by only referring to the HTML tag relationship table 131, or by removing attributes with lower weight values from the XPath by only referring to the HTML attribute importance table 132, or by removing tags and attributes with lower weight values by first referring to the HTML tag relationship table 131 and then referring to the HTML attribute importance table 132, or by removing tags and attributes with lower weight values by first referring to the HTML attribute importance table 132 and then referring to the HTML tag relationship table 131, or removing tags and attributes with lower weight values by referring to both tables simultaneously. Any one of the above cases falls into the spirit and scope of the present invention.

The system for adaptively locating a dynamic web page element according to an embodiment of the present invention is described in detail above. According to the same inventive concept, a method for adaptively locating a dynamic web page element according to an embodiment of the present invention is further described below.

Figure 2:
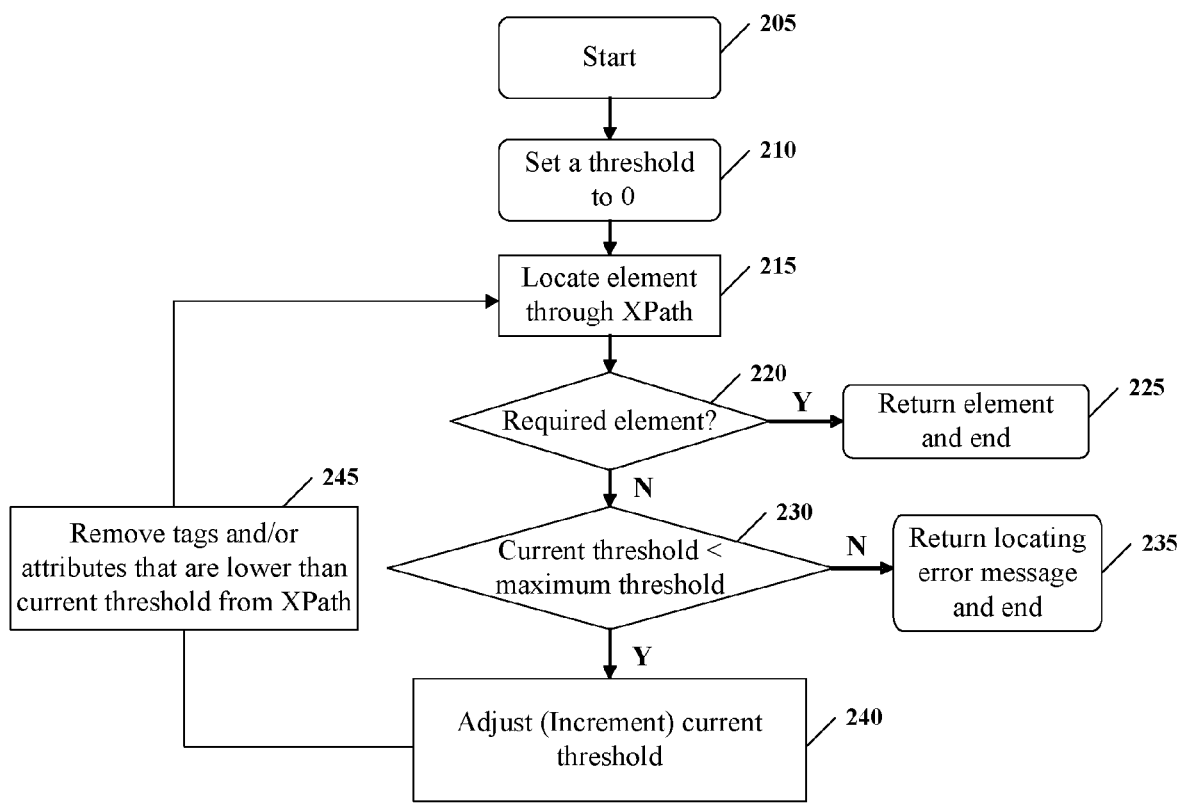
FIG. 2 illustrates an exemplary flowchart of a method for adaptively locating a dynamic web page element according to an embodiment of the present invention.

Now referring to FIG. 2, an exemplary flowchart of a method for adaptively locating a dynamic web page element according to an embodiment of the present invention is illustrated. Initially, the flow starts at Step 205 and proceeds to Step 210. At Step 210, a threshold is defined and set to 0. Afterwards, the flow enters a repeating or circular process, which starts at Step 215. At Step 215, the HTML DOM tree of the target web page is searched for the required web page element through the received XPath path expression, for example, by traversing the HTML DOM tree and locating the element there. Locating an element in an HTML DOM tree through XPath is well known by those skilled in the art, so that its further description is omitted here.

At Step 220, it is determined whether one or more elements can be found. If so, the flow proceeds to Step 225, in which the found elements are returned as a result node set, and the flow exits the circular process and ends. If at Step 220 it is determined that no element can be found, the flow proceeds to Step 230, in which it is determined whether the current threshold is less than a preset maximum threshold. If not, then the current threshold is larger than or equal to the preset maximum threshold, and the flow proceeds to Step 235, in which a locating error message is returned and the flow exits the circular process and ends. If at Step 230 it is determined that the current threshold is less than the preset maximum threshold, then the flow proceeds to Step 240, in which the threshold is adjusted.

In an embodiment of the invention, the adjusting of the threshold is to increment the current threshold. Depending on the query granularity of the required element to be implemented by this method and the demands on the system performance, the amplitude of threshold incrementing may be different. For example, referring to the weight values shown in the above Table 1 and Table 2, in a query with a finer granularity, the amplitude of threshold incrementing may be 0.1, so that it may be insured that the required web page element is located in a minimum range, where not too many different tags or attributes are removed at a time thereby resulting in multiple similar locating results. However, this will result in more execution time for the circular process, thereby increasing calculating overhead, and further increasing the overall operating overhead of the system.

In a query with a coarser granularity, the amplitude of threshold incrementing may be 0.3 or even 0.5 so that it may be insured that the required web page element can be located faster, thereby reducing the execution time of the circular process and saving system overhead. But it is possible to locate and output multiple similar resulting web page elements in the same execution loop, so that further comparing of the results by manual or machine execution to find the required web page element is needed.

After the current threshold is adjusted or incremented, the flow proceeds to Step 245, in which the refining process is performed step-by-step with respect to the XPath path expression of the web page element required by the user based on the HTML knowledge database.

In an embodiment of the present invention, by referring to the HTML tag relationships and attribute importance saved in the HTML knowledge database, the tags and/or attributes that are lower than the current threshold are removed from the XPath path expression.

Such a refining process expands the adaptation scope of the XPath path expression, thereby improving the possibility of finding the required web page element. As stated above, the refining process by combing HTML knowledge may be performed by only referring to HTML tag relationships, or by only referring to HTML attribute importance, or by first referring to HTML tag relationships then referring to HTML attribute importance, or by first referring to HTML attribute importance then referring to HTML tag relationships, or by referring to both simultaneously.

After the process of removing tags and/or attributes at Step 245, the refined XPath path expression which has a wider query scope is generated. The process flow returns to Step 215, in which the HTML DOM tree is traversed with the refined XPath and the element is located and the above process is repeated. Until the found web page element, result node set, is returned, Step 225, or a locating error message is returned, Step 235, the flow exits the circular process and ends.

The system and method for adaptively locating a dynamic web page element according to embodiments of the present invention are described in detail above. In order to better understand the system and method by those skilled in the art, some embodiments of the invention are to be illustrated in detail with respect to FIGS. 3 to 5.

Figure 3:
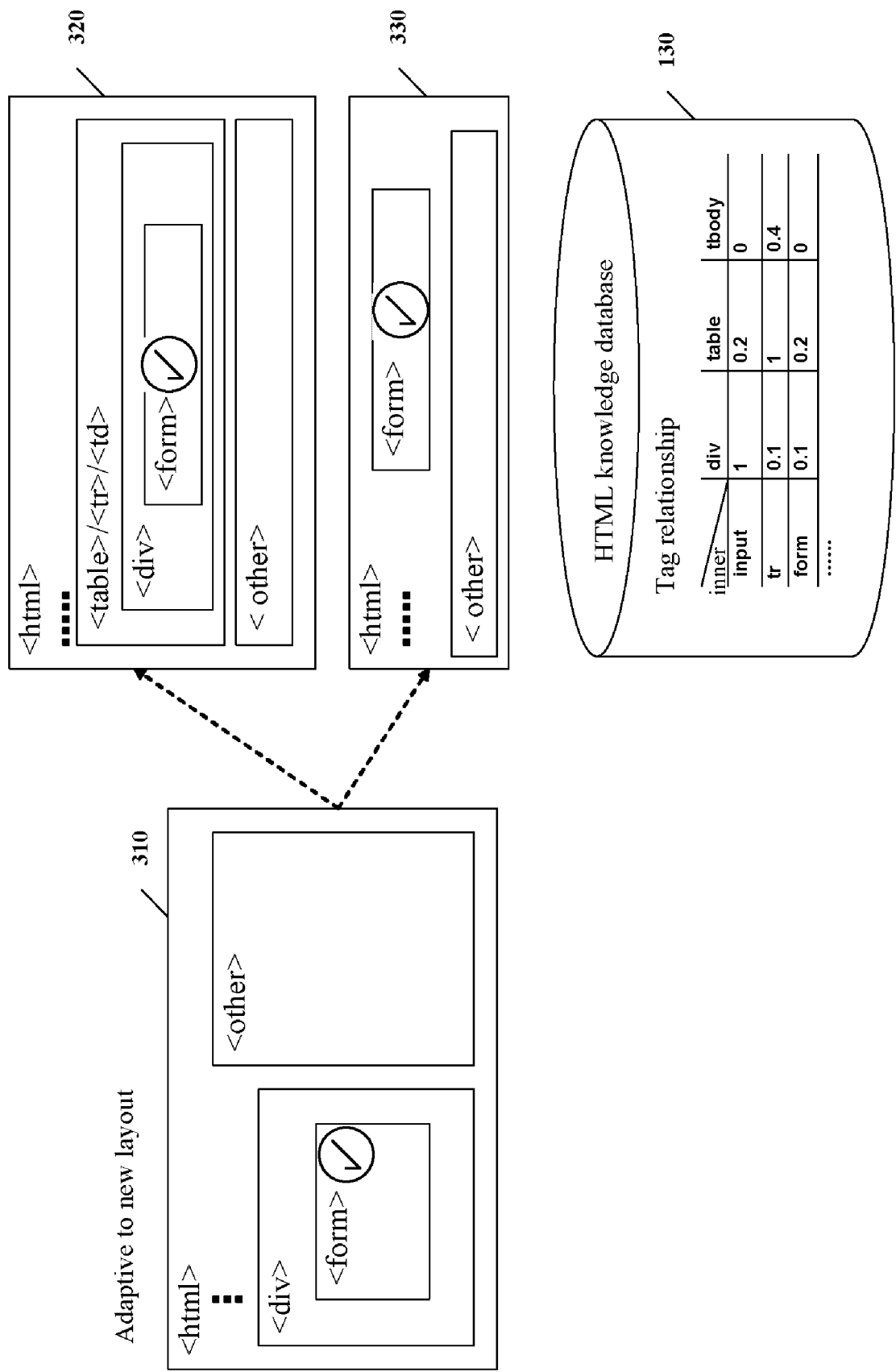
FIG. 3 illustrates an embodiment of the invention to be adaptive to a new layout.

First referring to FIG. 3, this figure illustrates an embodiment of the invention for adaptation to a new layout. On the left of FIG. 3, there is the original web page 310. For example, the web page element required by the user is a form, for which the corresponding HTML tag is <form>. It can be expressed by XPath as /html/ . . . /div/form, which is the original XPath path expression, where some nodes are ignored between the node of html and /div/form.

When the web page is dynamically changed, the form may be placed at a different location in the web page. For example, referring to the changed web page 320 on the right of FIG. 3, the tag of <form> is moved into a table. It can be expressed by XPath as /html/ . . . table/tr/td/div/form. When the user tries to access the required form through the original XPath path expression, first the original threshold is set to 0, and the circular process starts as shown in FIG. 2. In each cycle the threshold may be incremented, by which the XPath path expression is refined step-by-step.

Referring to the HTML tag relationship table in the HTML knowledge database 130 shown in FIG. 3, the relationship weight values of the tags of div, table are relatively lower (0.1, 0.2 respectively) in contrast to the tag of form. Further, although the tags of tr, td are not shown in the tag relationship table, it can be seen by those skilled in the art that the two table-related tags should have weight values that are substantially the same as the tag of table. Therefore, it can be seen that these tags will be removed when the threshold is incremented to 0.2, and a refined XPath path expression can be generated as /html . . . /form. Thus, the form element required by the user can be located according to the refined XPath. Then the form element is returned. It can be seen from the above that, although the location of the form element in the web page is changed, it can still be located successfully, indicated by the circled check mark.

Similarly, referring to the changed web page 330 on the right of FIG. 3, the form is placed at another location in the web page, i.e., <div> is removed from the XPath path expression. In the method flow as shown in FIG. 2, when the original XPath is refined as /html . . . //form, the form element required by the user can be located, indicated by the circled check mark. It can be seen that the present invention is adaptive to a new layout of a dynamic web page.

Figure 4:
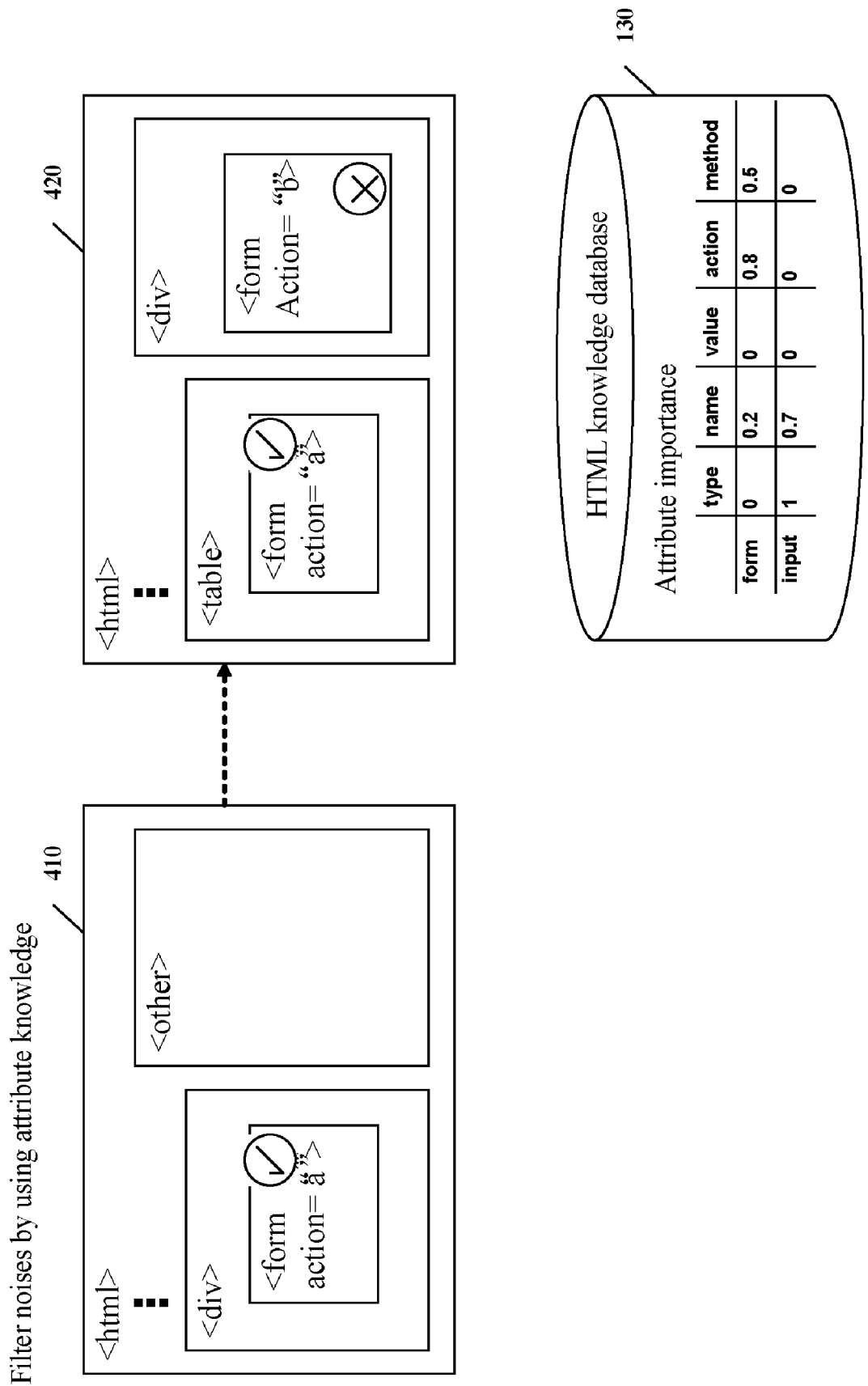
FIG. 4 illustrates an embodiment of the invention for filtering noise by using attribute knowledge.

Referring to the next figure. FIG. 4 illustrates an embodiment of the invention for filtering noise by using attribute knowledge. On the left of FIG. 4, there is the original web page 410. For example, the web page element required by the user is a form, for which the corresponding HTML tag is <form action="a">. It can be expressed by XPath as /html/ . . . /div/form[@action=a], which is the original XPath path expression, where some nodes are ignored between the node of html and /div/form. When the web page is dynamically changed, for example, referring to the changed web page 420 on the right of FIG. 4, the original form is moved out of the tag of <div> and moved into a table and there is added a new form in the web page, for which the corresponding HTML tag is <form action="b">. It appears in the tag of <div>.

When the user tries to access the form through the original XPath path expression, first the original threshold is set to 0, and the circular process starts as shown in FIG. 2. In each cycle the threshold may be incremented so that the XPath path expression is refined step-by-step. It can be seen from FIG. 3 that the tags of div, table in the changed web page 420 will not affect the locating of the required form by the invention.

Further, referring to the attribute importance table in the HTML knowledge database 130 shown in FIG. 4, the weight value corresponding to the attribute of action in the tag of form is 0.8. Therefore, in the process of incrementing the threshold step-by-step, the threshold is less than 0.8, i.e., in the process of refining the XPath path expression step-by-step, the attribute will be kept. Thus, through the attribute of action as a characteristic difference, the latter form that is newly added, <form action="b">, will not be selected as the result node, indicated by the circled cross. And when the XPath is refined as /html . . . //form[@action=a], the form element required by the user can be located, indicated by the circled check mark. Then the form element is returned. Thus, although the location of the form element in the web page is changed, and another similar form is added into the web page, the original form required by the user can still be located successfully. It can be seen from this example that the present invention can filter noise by using attribute knowledge.

Figure 5:
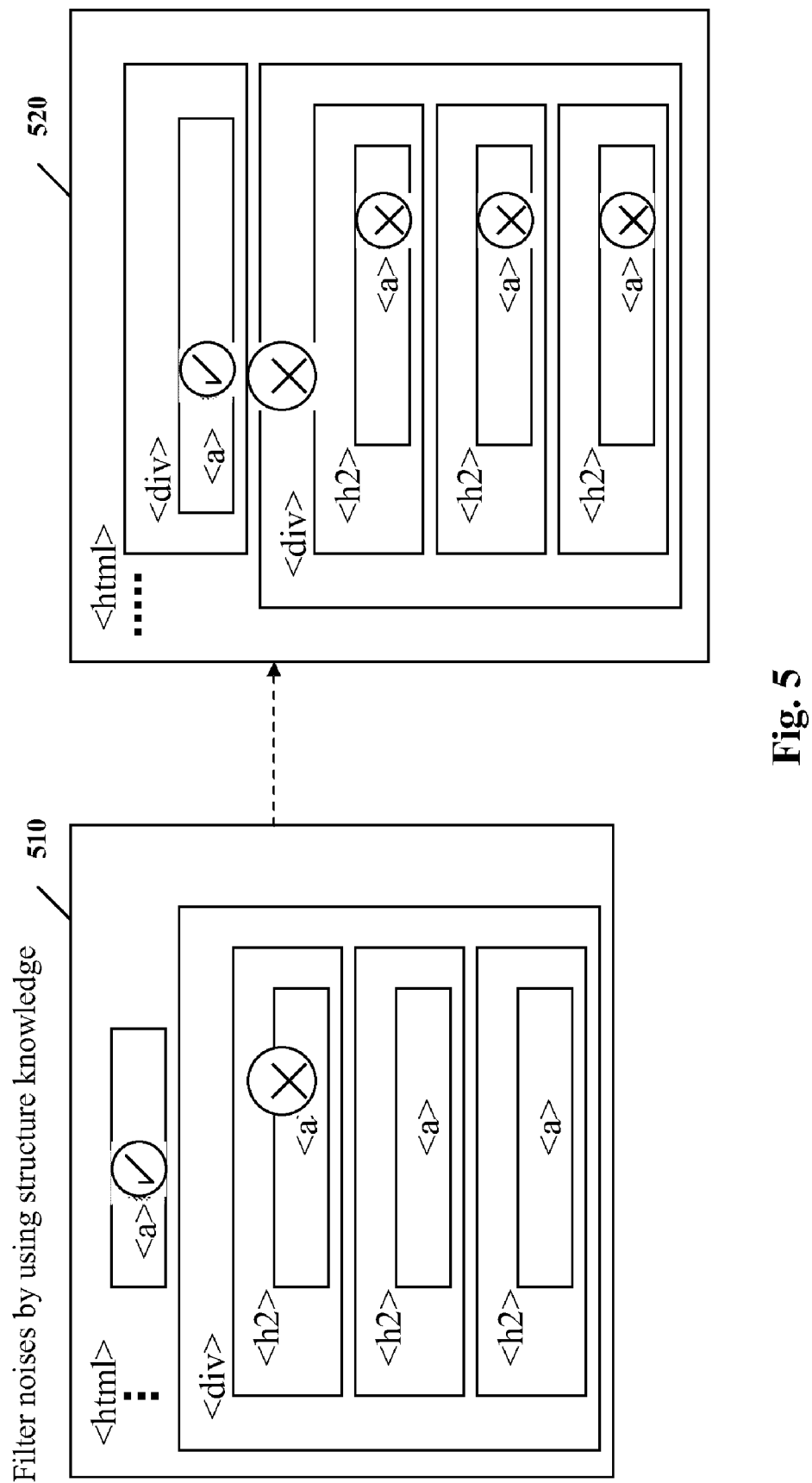
FIG. 5 illustrates an embodiment of the invention for filtering noise by using structure knowledge.

Referring to the next figure, FIG. 5 illustrates an embodiment of the invention for filtering noise by using structure knowledge. On the left of FIG. 5, there is the original web page 510. For example, the web page element required by the user is a node <a>. It can be expressed by XPath as /html/ . . . /a, which is the original XPath path expression, where some nodes are ignored between the node of html and a. There are several similar web page elements in the original web page, i.e., similar nodes <a>, which can be expressed by XPath as /html/ . . . /div/h2/a. When the web page is dynamically changed, for example, referring to the changed web page 520 on the right of FIG. 5, the node <a> required by the user is moved into the tag of <div>.

When the user tries to access the required node <a> through the original XPath path expression, first the original threshold is set to 0, and the circular process starts as shown in FIG. 2. In each cycle the threshold may be incremented, for which the XPath path expression is refined step-by-step. Herein it is assumed that the relationship between the tag of <h2> and <a> is very close, i.e., the corresponding relationship weight value is high.

It can be appreciated by those skilled in the art that, since the tag relationship can be adjusted manually, it is possible that the corresponding weight value is high. When the XPath is refined as /html . . . //a, since the tag <h2> exists as the characteristic difference, the similar nodes <a> in the original web page will not affect the locating of the required node <a> in the changed web page by the invention, so that the element required by the user can be located. Then the element is returned. It can be seen that, although the location of the element in the web page is changed, and there are several similar elements in the original web page, the original web page element required by the user can still be located successfully, indicated by the circled check mark. It can be seen from this example that the present invention can filter noise, indicated by the circled check cross, by using structure knowledge. It is noted that, without the assistance of the HTML knowledge database, the above noise (similar elements) cannot be filtered through a pure relative XPath, so that the purpose of adaptively locating a web page element in a dynamic web page cannot be achieved.

The system and method for adaptively locating a dynamic web page element according to embodiments of the present invention are described in detail above. As appreciated by the person with ordinary skills in the art, the present invention may be embodied as a method, a system, and/or a computer program product. Therefore, the present invention can be embodied in the form of entire hardware, entire software, or the combination of software and hardware.

Additionally, the present invention may be embodied as a computer program product contained on machine-readable media where the computer executable program instructions for programming a computer system to execute the process according to an embodiment of the invention are stored. The term "machine-readable media" used here includes any media that provide the computer system with instructions for execution. Such media may take various forms, including but not limited to: non-volatile media, volatile media, and transmission media. Non-volatile media commonly include, for example, floppy disk, floppy magnetic disk, hard disk, magnetic tape, or any other magnetic media, CD-ROM or any other optical media, slotted card or any other physical media with hole patterns, PROM, EPROM, EEPROM, flash memory, any other memory chip or cartridge, or any other media that can be read by the computer system and are appropriate for storing instructions.

Additionally, it should be appreciated that each block in the flow chart or block chart and the combination of some blocks may be implemented by computer program instructions. These computer program instructions may be provided to a general purpose computer, a specific purpose computer, or a processor of other programmable data processing device, to produce a machine, in which these instructions, when executed by the computers or the processor of other programmable data processing device, can create the means for implementing the functions indicated by the blocks of the block chart and/or the flow chart.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A system for adaptively locating dynamic web page elements, said system comprising:
   a computer processor;
   an Extensible Markup Language Path Language (XPath) refiner for refining by the computer processor an XPath path expression of the web page element based on a Hypertext Markup Language (HTML) knowledge database describing an HTML tag relationship and an attribute importance; and
   an enhanced XPath resolving engine for searching by the computer processor an HTML Document Object Model (DOM) tree of a target web page for the web page element through the refined XPath path expression;
   wherein the HTML knowledge database further comprises an HTML tag relationship table and an HTML attribute importance table, wherein the HTML tag relationship table is configured for representing said relationships between HTML tags, and wherein the HTML attribute importance table is configured for representing said importance of HTML attributes relative to HTML tags;

wherein the relationships between HTML tags and the importance of HTML attributes relative to HTML tags are represented by weight values;

wherein the enhanced XPath resolving engine is configured to output a result set when elements are found in the HTML DOM tree according to the XPath path expression; and when no element is found, to notify the XPath refiner to further refine the XPath path expression;

wherein the XPath refiner is further configured to remove tags whose relationships do not achieve a threshold based on the HTML knowledge database from the XPath path expression;

wherein the XPath refiner is further configured to adjust the threshold when no element is found by the enhanced XPath resolving engine.

2. The system according to claim 1, wherein the XPath refiner is further configured to remove attributes that do not achieve a threshold importance based on the HTML knowledge database from the XPath path expression.

3. The system according to claim 1, wherein the adjustment of the threshold is changed depending on the query granularity of the required web page element or the demands on system performance.

4. The system according to claim 1, wherein the XPath refiner is further configured to notify the enhanced XPath resolving engine to stop the process of locating the web page element when the threshold achieves a preset limit value and to return an error message.

5. A method for adaptively locating a dynamic web page element, the method comprising:

refining an XPath path expression of the web page element based on an HTML knowledge database describing HTML tag relationships and an attribute importance, the HTML knowledge database further comprises an HTML tag relationship table and an HTML attribute importance table;

searching an HTML DOM tree of a target web page for the web page element through the refined XPath path expression;

representing the relationships between HTML tags and the importance of HTML attributes relative to HTML tags by weight values;

outputting a result set when elements are found in the HTML DOM tree according to the XPath path expression;

notifying the XPath refiner to further refine the XPath path expression when no element is found;

removing tags whose relationships do not achieve a threshold based on the HTML knowledge database from the XPath path expression; and adjusting the threshold when no element is found.

6. The method according to claim 5, further comprising:

removing from the XPath path expression attributes whose importance does not achieve a threshold based on the HTML knowledge database.

7. The method according to claim 5, further comprising:

adjusting the threshold based on the HTML knowledge database from the XPath path expression.

8. The method according to claim 5, further comprising:

adjusting the threshold based on a query granularity of the required web page element or on a demand on system performance.

9. The method according to claim 5, further comprising:

stopping the process of locating the web page element and returning an error message when the threshold achieves a preset limit value.

10. A non-transient computer readable article of manufacture tangibly embodying computer readable instructions for executing a computer implemented method for adaptively locating a dynamic web page element, the method comprising:

refining an XPath path expression of the web page element based on an HTML knowledge database describing HTML tag relationships and an attribute importance, the HTML knowledge database further comprises an HTML tag relationship table and an HTML attribute importance table;

searching an HTML DOM tree of a target web page for the web page element through the refined XPath path expression;

representing the relationships between HTML tags and the importance of HTML attributes relative to HTML tags by weight values;

outputting a result set when elements are found in the HTML DOM tree according to the XPath path expression;

notifying the XPath refiner to further refine the XPath path expression when no element is found;

removing tags whose relationships do not achieve a threshold based on the HTML knowledge database from the XPath path expression; and stopping the process of locating the web page element and returning an error message when the threshold achieves a preset limit value.

11. The computer readable article of manufacture of claim 10, wherein the computer implemented method further comprises removing from the XPath path expression attributes whose importance does not achieve a threshold based on the HTML knowledge database.

12. The computer readable article of manufacture of claim 10, wherein the computer implemented method further comprises adjusting the threshold when no element is found.

13. The computer readable article of manufacture of claim 12, wherein the computer implemented method further comprises adjusting the threshold based on the HTML knowledge database from the XPath path expression.

14. The computer readable article of manufacture of claim 12, adjusting the threshold based on the HTML knowledge database from the XPath path expression.

* * * * *